(12) United States Patent
Worden et al.

(10) Patent No.: US 11,975,919 B2
(45) Date of Patent: May 7, 2024

(54) AGV PAYLOAD STORAGE SWAPPING SYSTEM

(71) Applicant: Google LLC, Mountain View, CA (US)

(72) Inventors: Nathanael Arling Worden, Mill Creek, WA (US); Samuel Gardner Garrett, Seattle, WA (US); David Kyle Funnell, Seattle, WA (US); Karl Eric Schrader, Snohomish, WA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/699,974

(22) Filed: Dec. 2, 2019

(65) Prior Publication Data

US 2021/0163226 A1  Jun. 3, 2021

(51) Int. Cl.
*B65G 1/137* (2006.01)
*B25J 5/00* (2006.01)

(52) U.S. Cl.
CPC .............. *B65G 1/137* (2013.01); *B25J 5/007* (2013.01)

(58) Field of Classification Search
CPC ................................. B65G 1/137; B25J 5/007
See application file for complete search history.

(56) References Cited

U.S. PATENT DOCUMENTS

| | | | | |
|---|---|---|---|---|
| 4,983,091 A * | 1/1991 | Lichti, Sr. | .............. | B65G 1/127 414/331.03 |
| 5,090,863 A * | 2/1992 | Lichti, Sr. | .............. | B65G 1/127 414/331.03 |
| 5,238,351 A * | 8/1993 | Lichti, Sr. | .............. | B65G 1/127 211/1.51 |
| 5,273,392 A * | 12/1993 | Bernard, II | .......... | B65G 1/0485 198/346.2 |
| 5,282,712 A * | 2/1994 | Lichti, Sr. | .............. | B65G 17/44 211/1.51 |

(Continued)

FOREIGN PATENT DOCUMENTS

CN  1349464 A  5/2002
CN  107471195 A  12/2017

(Continued)

OTHER PUBLICATIONS

Extended European Search Report for European Patent Application No. 20211040.9 dated May 4, 2021. 16 pages.

(Continued)

*Primary Examiner* — Kyle O Logan
(74) *Attorney, Agent, or Firm* — Lerner David LLP (57) ABSTRACT

An automated cargo delivery system is provided, including an automated guided vehicle having a housing defining a recess therein and a propulsion system configured to move the housing. The recess may be configured to receive a plurality of swappable carriers each having a uniform width in a horizontal direction and a uniform height in a vertical direction perpendicular to the horizontal direction. Each of the swappable carriers may be configured to be engaged within the recess. The plurality of swappable carriers may include a first swappable carrier and a second swappable carrier. A method of delivering cargo with the automated guided vehicle is also provided. The method may include alternatingly inserting and engaging the first swappable carrier and the second swappable carrier into the recess of the automated guided vehicle.

22 Claims, 6 Drawing Sheets

(56) References Cited

U.S. PATENT DOCUMENTS

| | | | | |
|---|---|---|---|---|
| 7,890,207 | B2* | 2/2011 | Toscano | G11B 33/12 700/214 |
| 7,908,029 | B2* | 3/2011 | Slocum, III | B25J 9/0093 700/214 |
| 7,987,018 | B2* | 7/2011 | Polyakov | G11B 27/36 700/214 |
| 7,996,174 | B2* | 8/2011 | Garcia | G11B 5/4555 702/115 |
| 8,041,449 | B2* | 10/2011 | Noble | G11B 20/1816 700/213 |
| 8,482,915 | B2* | 7/2013 | Merrow | G11B 33/144 361/679.47 |
| 8,687,349 | B2* | 4/2014 | Truebenbach | G11B 33/128 361/679.01 |
| 9,001,456 | B2* | 4/2015 | Campbell | G11B 33/128 360/92.1 |
| 10,308,430 | B1* | 6/2019 | Brady | G05D 1/0027 |
| 2009/0153994 | A1* | 6/2009 | Merrow | G06F 1/187 360/31 |
| 2012/0136477 | A1* | 5/2012 | Merrow | G11B 17/225 700/218 |
| 2015/0032252 | A1* | 1/2015 | Galluzzo | B60P 1/5423 700/218 |
| 2016/0176638 | A1* | 6/2016 | Toebes | G05D 1/0212 701/25 |
| 2017/0043953 | A1* | 2/2017 | Battles | B65G 1/04 |
| 2018/0089474 | A1* | 3/2018 | Ramon | G06K 19/06028 |
| 2018/0265297 | A1* | 9/2018 | Nakano | B66F 9/06 |
| 2019/0129371 | A1* | 5/2019 | Wagner | B65G 1/0478 |
| 2019/0188632 | A1* | 6/2019 | Galluzzo | B25J 15/0028 |
| 2020/0130951 | A1* | 4/2020 | Wagner | B07C 3/08 |
| 2021/0351523 | A1* | 11/2021 | Dawson | H01R 4/48 |
| 2023/0067327 | A1* | 3/2023 | Fletcher | B65D 88/005 |

FOREIGN PATENT DOCUMENTS

| | | |
|---|---|---|
| CN | 108137232 A | 6/2018 |
| WO | 2016014917 A1 | 1/2016 |
| WO | 2017197121 A1 | 11/2017 |
| WO | 2018147953 A1 | 8/2018 |

OTHER PUBLICATIONS

Office Action for Chinese Patent Application No. 202011385439.2 dated Jul. 24, 2023. 6 pages.

Office Action for European Patent Application No. 20211040.9 dated Jun. 20, 2023. 8 pages.

* cited by examiner

AGV PAYLOAD STORAGE SWAPPING SYSTEM

BACKGROUND

Due to the precision requirements, industrial manufacturing robots are typically used with a high-tolerance movement capability. To accompany the high precision manipulators, a specialized storage system is typically required to maintain determinate positioning of payload units. The mechanical constraints of typical payload storage systems preclude payloads from being carried in a slot not designed for them. This imposes a tradeoff between flexibility and storage capacity for any given payload.

Mobile robotics platforms such as automated guided vehicles ("AGVs") are one example of such industrial manufacturing robots, and they are often designed for a single task. Each single-task platform may experience significant downtime when other single-task platforms are needed. This inflexibility may increase the total cost of the robotics platforms compared to a mobile robotics platform that could perform multiple tasks. It would therefore be desirable to increase the storage flexibility of mobile robotics platforms.

BRIEF SUMMARY

The present disclosure provides for automated cargo delivery systems and methods of delivering cargo with automated guided vehicles, using a plurality of swappable carriers each having uniform exterior dimensions to deliver different-sized payload units with a single automated guide vehicle.

One aspect of the disclosure provides an automated cargo delivery system including an automated guided vehicle having a housing defining a recess therein and a propulsion system configured to move the housing. The recess may be configured to receive a plurality of swappable carriers each having a uniform width in a horizontal direction and a uniform height in a vertical direction perpendicular to the horizontal direction. Each of the swappable carriers may be configured to be engaged within the recess. The plurality of swappable carriers may include a first swappable carrier and a second swappable carrier.

The automated guided vehicle may also include a rail affixed to the housing and extending within the recess in the depth direction. The rail may be configured to alternatingly engage with a corresponding portion of a first frame of the first swappable carrier and with a corresponding portion of a second frame of the second swappable carrier. The propulsion system may include a plurality of wheels rotatably mounted to the housing, a driving element configured to rotate the wheels, a steering system configured to pivot the wheels and navigate the housing along predetermined paths, and a processor configured to control the motor and the steering system. The automated guided vehicle may also include an actuatable lock that is configured to alternatingly engage with a corresponding feature of a first frame of the first swappable carrier and a second frame of the second swappable carrier. The actuatable lock may be configured to alternatingly securely retain the first swappable carrier and the second swappable carrier within the recess. The automated cargo delivery system may also include the first swappable carrier. The first swappable carrier may be disposed within the recess, and the actuatable lock may be engaged with the corresponding feature of the first frame of the first swappable carrier, such that the first swappable carrier is securely retained within the recess.

The automated cargo delivery system may also include the plurality of swappable carriers including the first swappable carrier and the second swappable carrier. The first swappable carrier may include a first frame defining a plurality of uniform first slots extending within the first frame in a depth direction perpendicular to the horizontal direction and the vertical direction, each of the first slots configured to removably receive a first payload unit therein, each of the first slots having first dimensions including a first width in the horizontal direction and a first height in the vertical direction. The second swappable carrier may include a second frame defining a plurality of uniform second slots extending within the second frame in the depth direction, each of the second slots configured to removably receive a second payload unit therein, each of the second slots having second dimensions including a second width in the horizontal direction and a second height in the vertical direction. At least one of the first dimensions may be different than a respective corresponding one of the second dimensions, such that either the first payload unit does not fit in any of the second slots or the second payload unit does not fit in any of the first slots.

A first number of the first slots may be arranged within the first swappable carrier in a first grid of rows and columns extending in the respective horizontal and vertical directions, and a second number of the second slots may be arranged within the second swappable carrier in a second grid of rows and columns, the first number being different than the second number. Each row of slots of the first frame of the first swappable carrier and the second frame of the second swappable carrier may be supported by a respective support plate that defines a respective plane that extends in the depth direction and the horizontal direction. Adjacent ones of the slots of the first frame and the second frame may be separated from one another by a respective separation plate that defines a respective plane extending in the depth direction and the vertical direction. At least one of the first frame of the first swappable carrier or the second frame of the second swappable carrier may define additional slots extending therein, each of the additional slots having third dimensions including a third width in the horizontal direction and a third height in the vertical direction, and at least one of the third dimensions may be different than a respective corresponding one of the first dimensions or the second dimensions.

The automated cargo delivery system may also include the first payload unit received within each of the first slots, each of the first payload units having a unit width in the horizontal direction that is less than the first width and a unit height in the vertical direction that is less than the first height, the first payload units being securely engaged within the first slots. The automated cargo delivery system may also include a robotic manipulator mounted to the housing, the robotic manipulator having an end effector remote from the housing that is configured to alternatingly grasp the first payload unit and the second payload unit, the robotic manipulator being configured to removably insert the first payload unit into one of the first slots and configured to removably insert the second payload unit into one of the second slots.

Another aspect of the disclosure provides a method of delivering cargo with an automated guided vehicle. The method may include inserting and engaging a first swappable carrier into a recess defined in a housing of the automated guided vehicle, automatically moving the automated guided vehicle from a base station to a first target location, automatically moving the automated guided vehicle from the first target location to the base station, disengaging and removing the first swappable carrier from the recess of the automated guided vehicle, inserting and engaging the second swappable carrier into the recess of the automated guided vehicle, and automatically moving the automated guided vehicle from the base station to a second target location.

The first and second swappable carriers each may have a uniform width in a horizontal direction and a uniform height in a vertical direction perpendicular to the horizontal direction. The inserting of the first and second swappable carriers into the recess of the automated guided vehicle may include sliding the respective first and second swappable carriers along a rail that is affixed to the housing and that extends within the recess in a depth direction of the recess. The automatically moving steps may be performed by a propulsion system rotating a plurality of wheels that are mounted to the housing and by a steering system that pivots the wheels and navigates the housing along predetermined paths.

The engaging of the first and second swappable carriers into the recess of the automated guided vehicle may include actuating a lock that engages with a corresponding feature of first and second frames of the respective first and second swappable carriers. The actuating of the lock may include actuating a pneumatic cylinder that translates a securing pin into engagement with an aperture extending through a structural member of a respective one of the first and second frames. The inserting of the first and second swappable carriers into the recess of the automated guided vehicle may be performed by an end effector of a robotic manipulator mounted to the housing of the automated guided vehicle.

The method may also include loading a plurality of first payload units into a plurality of uniform first slots extending within a first frame of the first swappable carrier, the first slots extending in a depth direction of the first swappable carrier, each of the first slots having first dimensions including a first width in a horizontal direction perpendicular to the depth direction and a first height in a vertical direction perpendicular to both the depth and vertical directions. The method may also include removing one of the first payload units from the first swappable carrier and installing the one of the first payload units at the first target location.

The method may also include loading a plurality of second payload units into a plurality of uniform second slots extending within a second frame of the second swappable carrier, the second slots extending in the depth direction, each of the second slots having second dimensions including a second width in the horizontal direction and a second height in the vertical direction. The method may also include removing one of the second payload units from the second swappable carrier and installing the one of the second payload units at the second target location. At least one of the first dimensions may be different than a respective corresponding one of the second dimensions, such that either the first payload unit does not fit in any of the second slots or the second payload unit does not fit in any of the first slots.

The loading of the first and second payload units and the removing of the one of the first and second payload units may be performed by an end effector of a robotic manipulator mounted to the housing of the automated guided vehicle. A first number of the first slots may be arranged within the first swappable carrier in a first grid of rows and columns extending in the respective horizontal and vertical directions, and a second number of the second slots may be arranged within the second swappable carrier in a second grid of rows and columns, the first number being different than the second number. At least one of the first frame of the first swappable carrier or the second frame of the second swappable carrier may define additional slots extending therein, each of the additional slots having third dimensions including a third width in the horizontal direction and a third height in the vertical direction, and at least one of the third dimensions may be different than a respective corresponding one of the first dimensions or the second dimensions.

DETAILED DESCRIPTION

The technology relates generally a flexible mobile robotics platform that is designed for a plurality of tasks. In particular, the platform provides an AGV having a cargo system with a swappable carrier that is configured to store a plurality of payload units. The swappable carrier may be removed and replaced with other swappable carriers having different payload unit storage configurations. The cargo system includes a mounting bracket and an actuatable coupling system that is configured to releasably couple the swappable carrier to a mounting bracket.

The flexible mobile robotics platform described above may have various benefits and advantages. The flexible platform is designed to store different types of payload units. Moreover, the swappable carrier is low cost, easily detachable and connectable, and provides for storage of a wide range of payload units of different sizes. Even further, swappable carrier can be removed and replaced in an automated fashion.

This flexible mobile robotics platform may allow a much greater duration of operation for particular workflows, such as by optimizing component payload for specific mission types. The platform may also allow a single robot to be used for most or all material movement to and from a destination, such as storage racks, assembly lines, server racks, warehouses, loading docks, etc., thereby increasing capital utilization. The platform may also provide future-proofing against modified designs for mechanical components. For example, if new hardware is introduced, only a new carrier frame is required to transport such hardware, rather than requiring an AGV system retrofit or replacement.

Figure 1A:
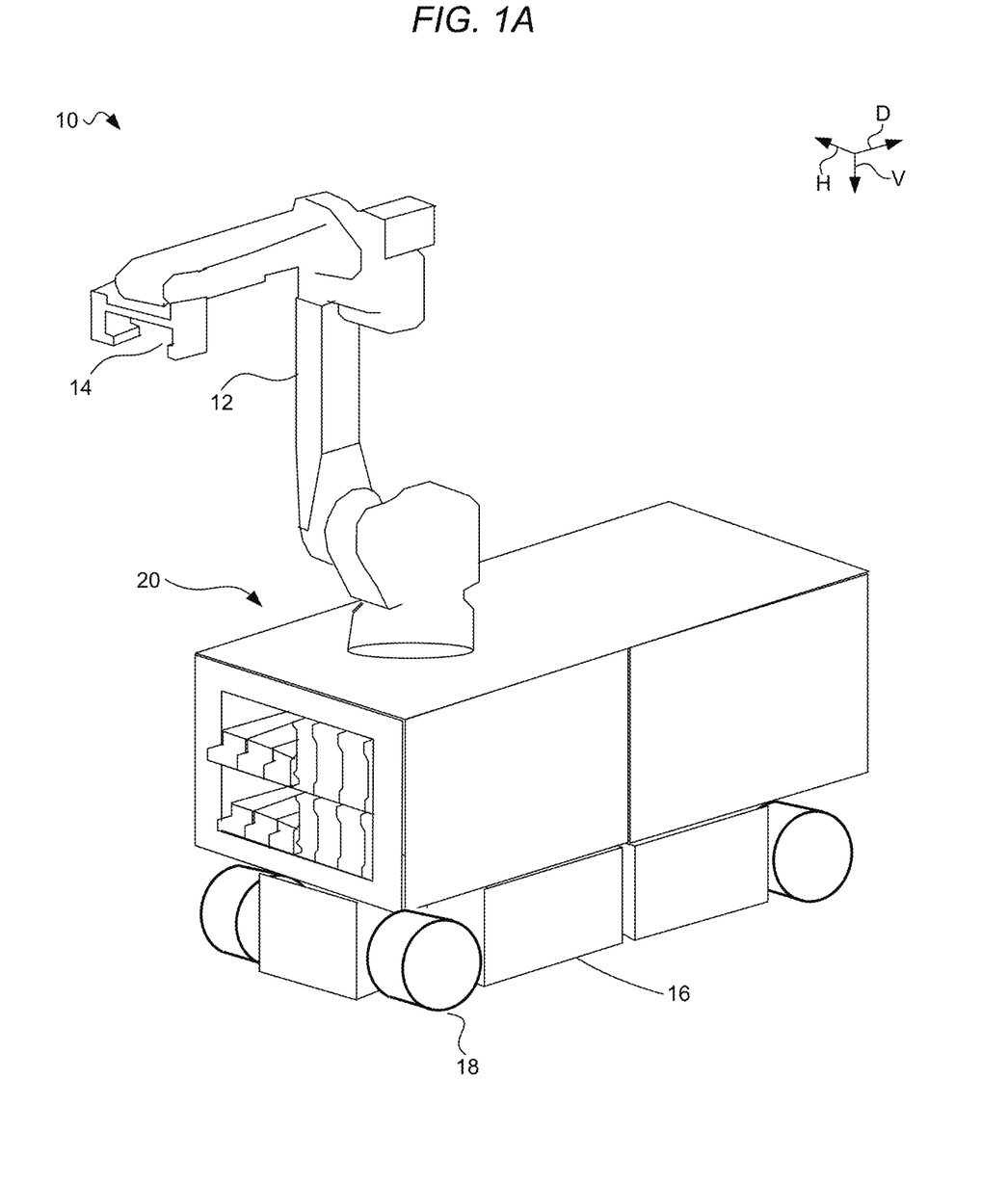
FIG. 1A is a perspective view of an AGV having a robotic manipulator mounted thereto and having payload units installed therein.

Referring to FIG. 1A, an AGV 10 includes a robotic manipulator 12 or other manipulator mounted to a cargo system 20. The robotic manipulator 12 has an end effector 14 disposed at an end thereof remote from the cargo system 20.

The robotic manipulator 12 may be configured to grasp payload units 16, to load them into the cargo system 20, and to remove them from the cargo system. The end effector 14 of the robotic manipulator 12 may be movable in three or more axes of motion. By way of example, the end effector 14 may be capable of translation in the H, V, and D directions, and rotation about rotational axes extending in the H, V, and D directions. The AGV 10 may be used, for example, for retrieval and storage of payload units 16 in a data center. The payload units 16 may be storage servers, compute servers, or battery modules, among others. The AGV 10 may be required to have high precision in its position and movement in a data center that is engineered to maximize cubic utilization and to minimize air bypass. The AGV may also include a plurality of wheels 18 rotatably mounted to the housing. It should be understood that the robotic manipulator 12 is one example of a manipulator, and that in other examples gantry systems or any of a variety of other mechanisms may be used.

Figure 1B:
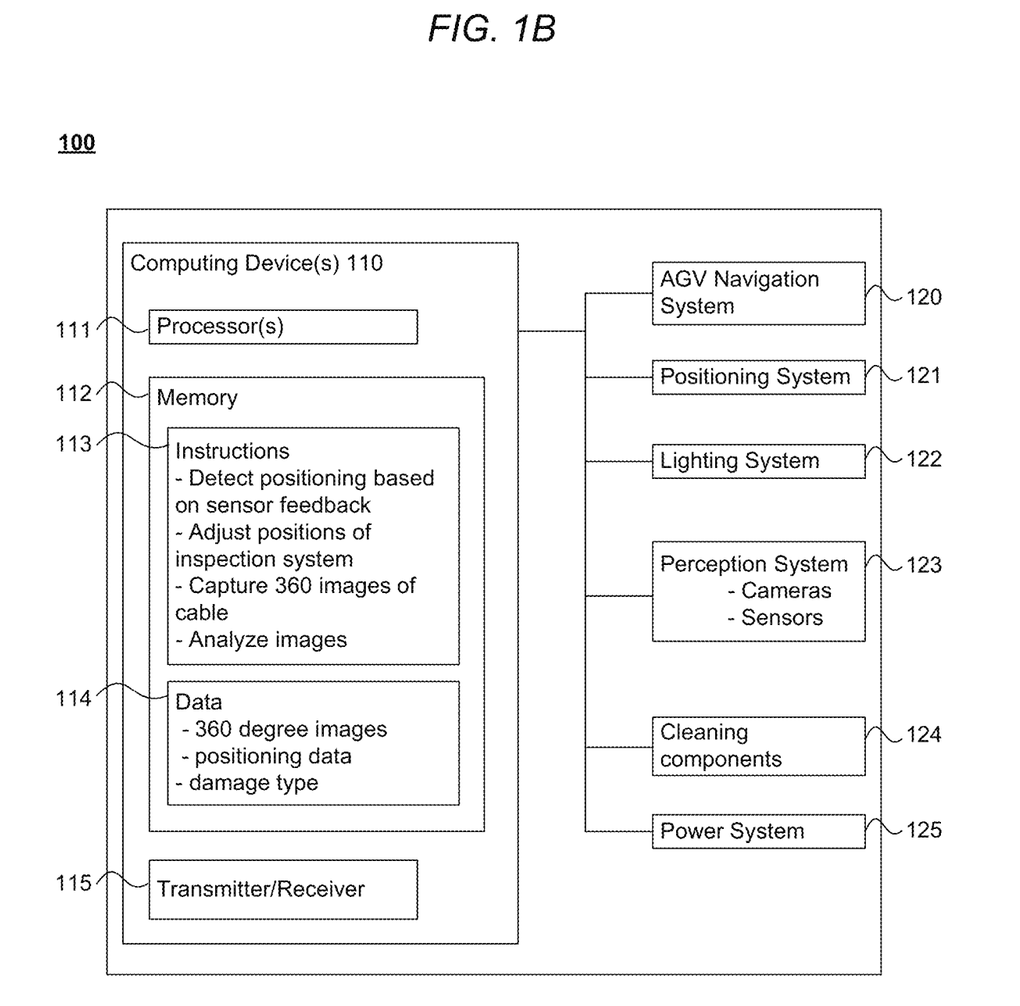
FIG. 1B is a diagrammatic view of a control system that may be used to control the AGV of FIG. 1A.

The AGV 10 may include a motor or another driving element (not shown) that is configured to rotate the wheels 18, a steering system (not shown) that is configured to navigate the AGV along predetermined paths, and a control system 100 (FIG. 1B) that is configured to control the motor and the steering system. The AGV 10 may also include sensors (not shown) for detecting where the AGV should be navigated and where the robotic manipulator 12 should deliver payload units 16. The exemplary configuration of the AGV 10 that is shown in FIG. 1 is merely one possible embodiment of a flexible mobile robotics platform. In other examples, there may be many other configurations of components for moving the AGV 10 from one location to another.

Referring to FIG. 1B, an example control system 100 is illustrated. As shown, the control system 100 includes one or more computing devices 110 coupled to various components 120-125, such as AGV navigation system 120, positioning system 121, lighting 122, perception system 123, cleaning components 124, and power system 125. The computing device 110 further includes one or more processors 111, memory 112, and other components typically present in microprocessors, general purpose computers, or the like.

The one or more processors 111 may be any conventional processors, such as commercially available microprocessors. Alternatively, the one or more processors may be a dedicated device such as an application specific integrated circuit (ASIC) or other hardware-based processor. In some examples, the one or more processors may include a graphics processing unit (GPU) and/or a tensor processing unit (TPU), for example, for machine-learning based perception. Although FIG. 1A functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. Similarly, the memory may be a hard drive or other storage media located in a housing different from that of computing device 110. Accordingly, references to a processor or computing device will be understood to include references to a collection of processors or computing devices or memories that may or may not operate in parallel.

Memory 112 may store information that is accessible by the processors 111, including instructions 113 that may be executed by the processors, and data 114. The memory 112 may be of a type of memory operative to store information accessible by the processors 111, including a non-transitory computer-readable medium, or other medium that stores data that may be read with the aid of an electronic device, such as a hard-drive, memory card, read-only memory ("ROM"), random access memory ("RAM"), digital versatile disc ("DVD") or other optical disks, as well as other write-capable and read-only memories. The subject matter disclosed herein may include different combinations of the foregoing, whereby different portions of the instructions 113 and data 114 are stored on different types of media.

Data 114 may be retrieved, stored or modified by processors 111 in accordance with the instructions 113. For instance, although the present disclosure is not limited by a particular data structure, the data 114 may be stored in computer registers, in a relational database as a table having a plurality of different fields and records, XML documents, or flat files. The data 114 may also be formatted in a computer-readable format such as, but not limited to, binary values, ASCII or Unicode. By further way of example only, the data 114 may be stored as bitmaps comprised of pixels that are stored in compressed or uncompressed, or various image formats (e.g., JPEG), vector-based formats (e.g., SVG) or computer instructions for drawing graphics. Moreover, the data 114 may comprise information sufficient to identify the relevant information, such as numbers, descriptive text, proprietary codes, pointers, references to data stored in other memories (including other network locations) or information that is used by a function to calculate the relevant data.

In one example, computing device 110 may be an AGV computing system incorporated into control system 100, such as an AGV having a robotic manipulator 12 and end effector 14. The computing device may capable of communicating with various components of the system autonomously, or without continuous input from a human operator. For example, computing device 110 may be in communication with various components 120-125 of the control system 100, which operate in accordance with the instructions 113 of memory 112 in an autonomous mode which does not require or need continuous or periodic input from an operator. Although these systems are shown as external to computing device 110, in other examples these systems may also be incorporated into the computing device.

The instructions 113 may be executed to perform various operations using one or more of the components 120-125 or other components not shown. For example, the AGV navigation system 120 may include a GPS or other system which directs the AGV to a target location for delivery of a payload unit 16. The positioning system 121 may be instructed to respond to feedback provided by the perception system 123, which may include one or more cameras, sensors, etc. For example, the positioning system 121 may include one or more motors or other devices used to control positioning of the AGV 10, the robotic manipulator 12, and/or the end effector 14. As the perception system 123 provides data regarding proximity of the target location to the end effector 14, the positioning system 121 may adjust a position of one or more of the AGV, robotic manipulator 12, or end effector so as to maintain a position where the payload unit 16 is in close proximity to the target location.

Lighting system 122 may include one or more LEDs or other illuminating devices. The lighting system 122 may be instructed to illuminate a target location for delivery of a payload unit 16 any time the AGV is within a predetermined distance from the target location, when environmental conditions are such that natural light is insufficient, or under any other circumstances. In this regard, the lighting system 122 may also be responsive to input from the perception system 123, such as feedback from light or proximity sensors. Similarly, cleaning components 124 may also respond to feedback from the perception system 123. For example, the one or more processors 111 may determine, based on images captured by the perception system 123, that the target location is dirty. As such dirt may be obstructing information, such as a QR code that needs to be read to determine which payload unit 16 to deliver to a target location, the cleaning components 124 may be instructed to spray air or perform some other operation to clear the debris. The power system 125 may include, for example, a battery for powering the control system 100.

While the components 110-115 and 120-125 are described above in reference to an example of a payload delivery mode, it should be understood that the components may also operate in response to operator input or other instructions. For example, the computing device 110 may provide information to a remote computing device, such as an operator control unit, through transmitter/receiver 115. Likewise, the computing device 110 may receive instructions from the remote operator control unit. In other examples, the control system 100 may operate in an autonomous payload delivery mode, but still provide feedback to a remote computing device using the transmitter/receiver 115.

Figure 2:
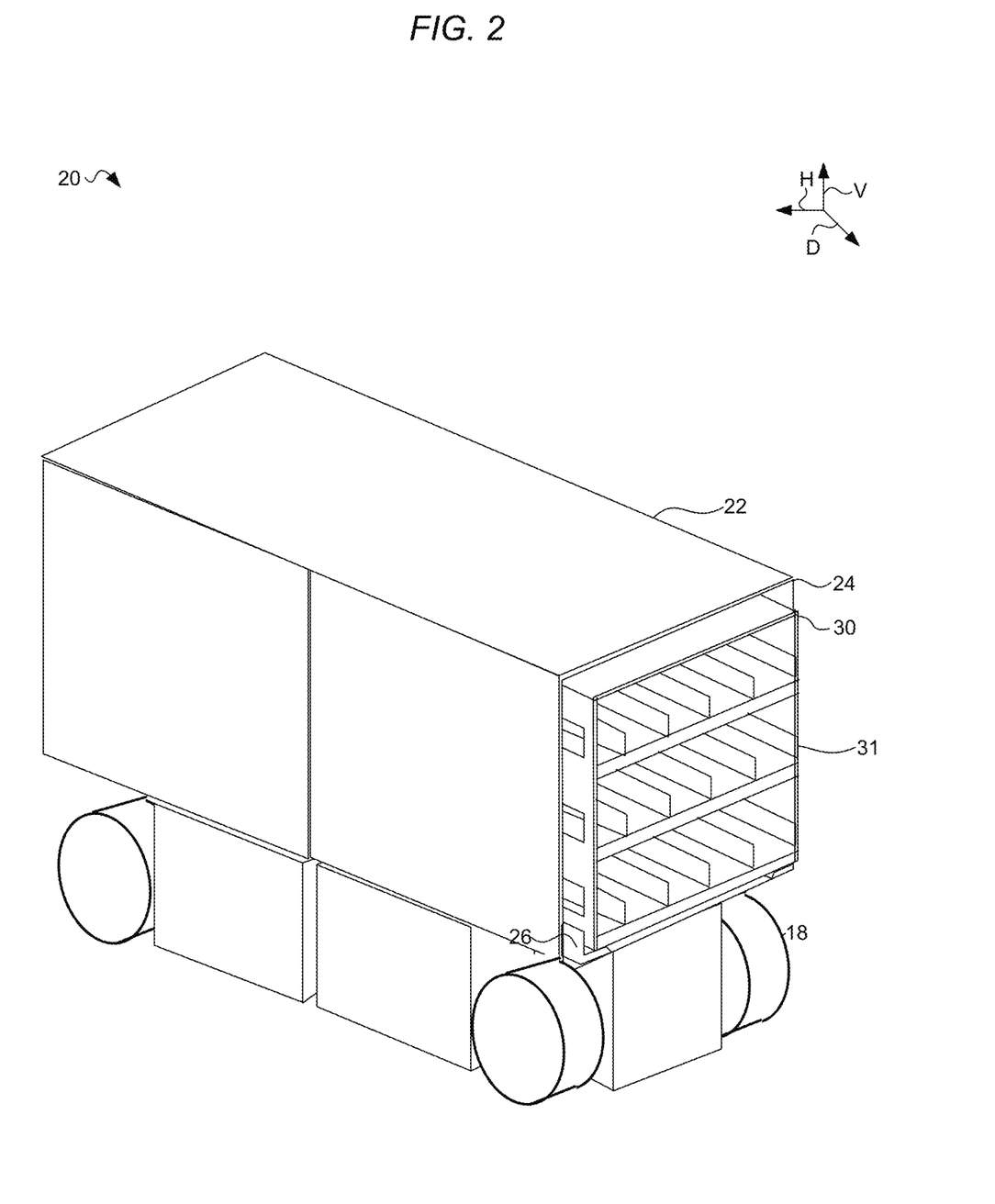
FIG. 2 is a perspective view of the cargo system of the AGV of FIG. 1A having a swappable carrier installed therein.

Referring to FIG. 2, the cargo system 20 includes a housing 22 that may have a box shape defining a recess 24 therein. As shown in FIG. 2, the housing 22 is generally in the shape of a rectangular prism, but in other examples, the housing may have any other shape, such as a square prism, a cylinder, or the like. The recess 24 is shown in FIG. 2 as having a rectangular prism shape, but in other examples, the recess may have any other shape (e.g., a square prism, a hexagonal prism, etc.) that is complementary to the shape of a swappable carrier 30, which will be described below. In some embodiments, the recess 24 may be replaced with a receiving bay that is not recessed from an exterior boundary of the housing 22. In such an example, the top and side walls enclosing the recess 24 may be omitted, and the swappable carrier 30 may be coupled to an upward-facing surface or a frontward-facing surface of the housing 22. In some examples, a plurality of recesses 24 and/or receiving bays may be provided, so that a plurality of the same or different swappable carriers 30 may be simultaneously carried in a single AGV 10.

The cargo system may include one or more rails 26 that are affixed to the housing 22 within the recess 24 and that extend in a depth direction D of the housing. The cargo system 20 may be configured to receive a swappable carrier 30 within the recess 24. The rails 26 may be made of a low-friction ultra-high molecular weight (UHMW) material, for example. Although only two rails 26 are shown in the figures, in other examples, the housing 22 may have a single rail, three rails, four rails, or any other number of rails each extending in the depth direction D. In embodiments in which the recess 24 is replaced with a receiving bay as described above, the rails 26 may be affixed to an upward-facing surface of the housing 22. In other examples, the rails 26 could be replaced with another releasable coupling mechanism that may be used to removably attach the swappable carrier 30 to a surface of the housing 22.

Figure 3:
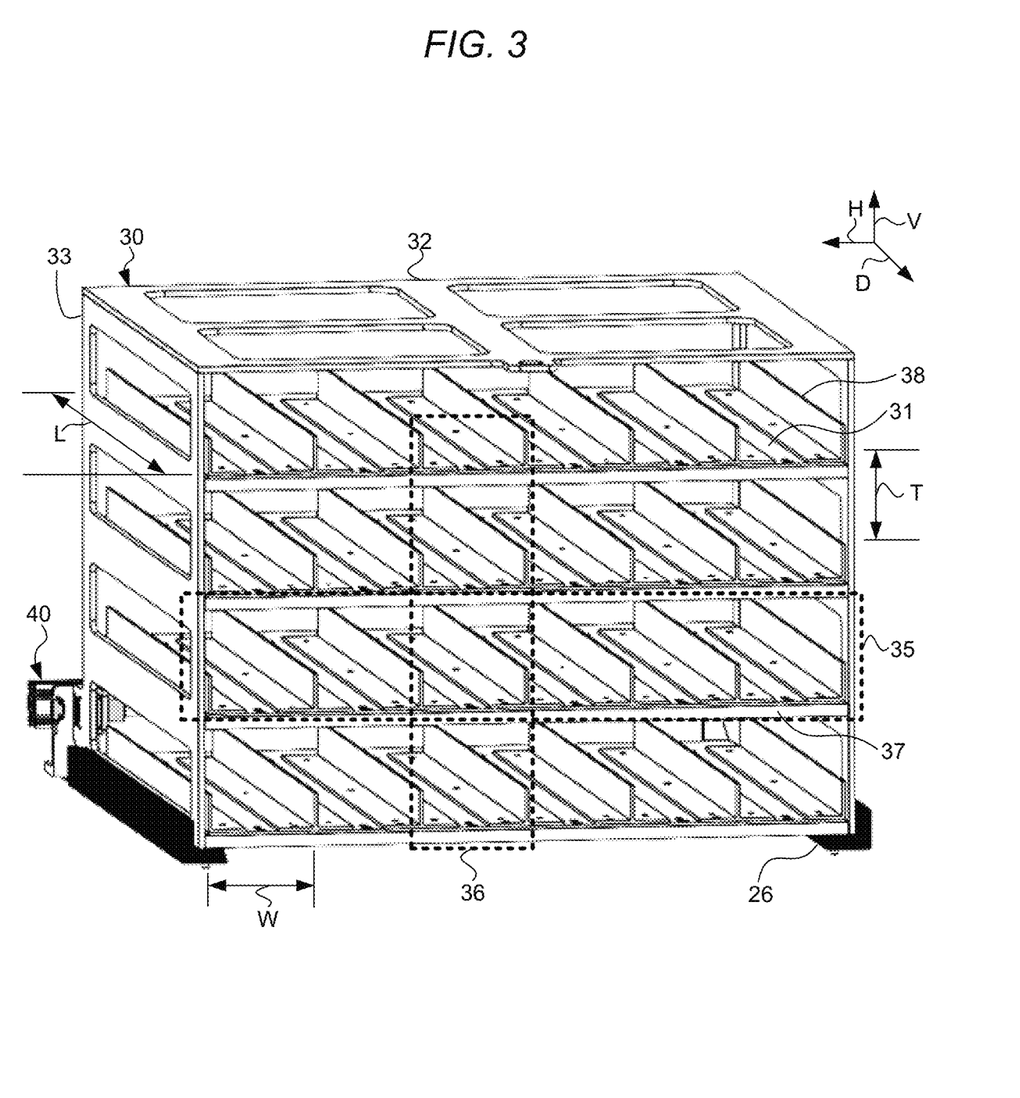
FIG. 3 is a perspective view of the swappable carrier of FIG. 1A engaged in rails of the cargo system and coupled to a mounting bracket of the cargo system.

Referring to FIG. 3, the swappable carrier 30 defines a plurality of slots 31 extending within a frame 32 between opposing side panels 33 thereof and preferably does not require electrical, air, or data connections to function. In the example shown in FIG. 3, the swappable carrier 30 has twenty-four slots 31 arranged in a four-by-six grid, with four rows 35 of slots each extending in a horizontal direction H perpendicular to the depth direction D and six columns 36 of slots each extending in a vertical direction V perpendicular to both the depth direction and the horizontal direction. Each slot 31 extends into the swappable carrier 30 in the depth direction D. According to one example, each slot 31 may be sized and shaped to hold a piece of equipment, such as tools or good used in manufacturing or other applications. According to some examples, the slots 31 may be sized for data center equipment, such as storage devices, server blades, etc.

Each row 35 of slots 31 is supported by a support plate 37 that defines a respective plane that extends in the depth direction D and the horizontal direction H. The support plates 37 separate adjacent ones of the rows 35 of slots 31 from one another. Each slot 31 is separated from adjacent ones of the slots by a separation plate 38 that defines a respective plane extending in the depth direction D and the vertical direction V. The separation plates 38 are spaced apart from one another in the horizontal direction H along the support plates 37. In the example shown, each separation plate 38 extends in the depth direction D between front and rear openings of the slots 31, and each separation plate extends in the vertical direction V about half of the distance between adjacent ones of the support plates 37.

In the example shown, each of the slots 31 has uniform dimensions that include a uniform width W in the horizontal direction H, a uniform height T in the vertical direction V, and a uniform length L in the depth direction D. One or more of the width, height, and length dimensions of the slots 31 may vary from any particular swappable carrier 30 that is configured to carry a first type of component to another type to a different swappable carrier that is configured to carry a second type of component. When the payload units 16 are received within corresponding ones of the slots 31, each of the payload units may have a unit width in the horizontal direction that is less than the uniform width W, a unit height in the vertical direction V that is less than the uniform height T, and a unit length in the depth direction D that is less than the uniform length L.

Figure 4:
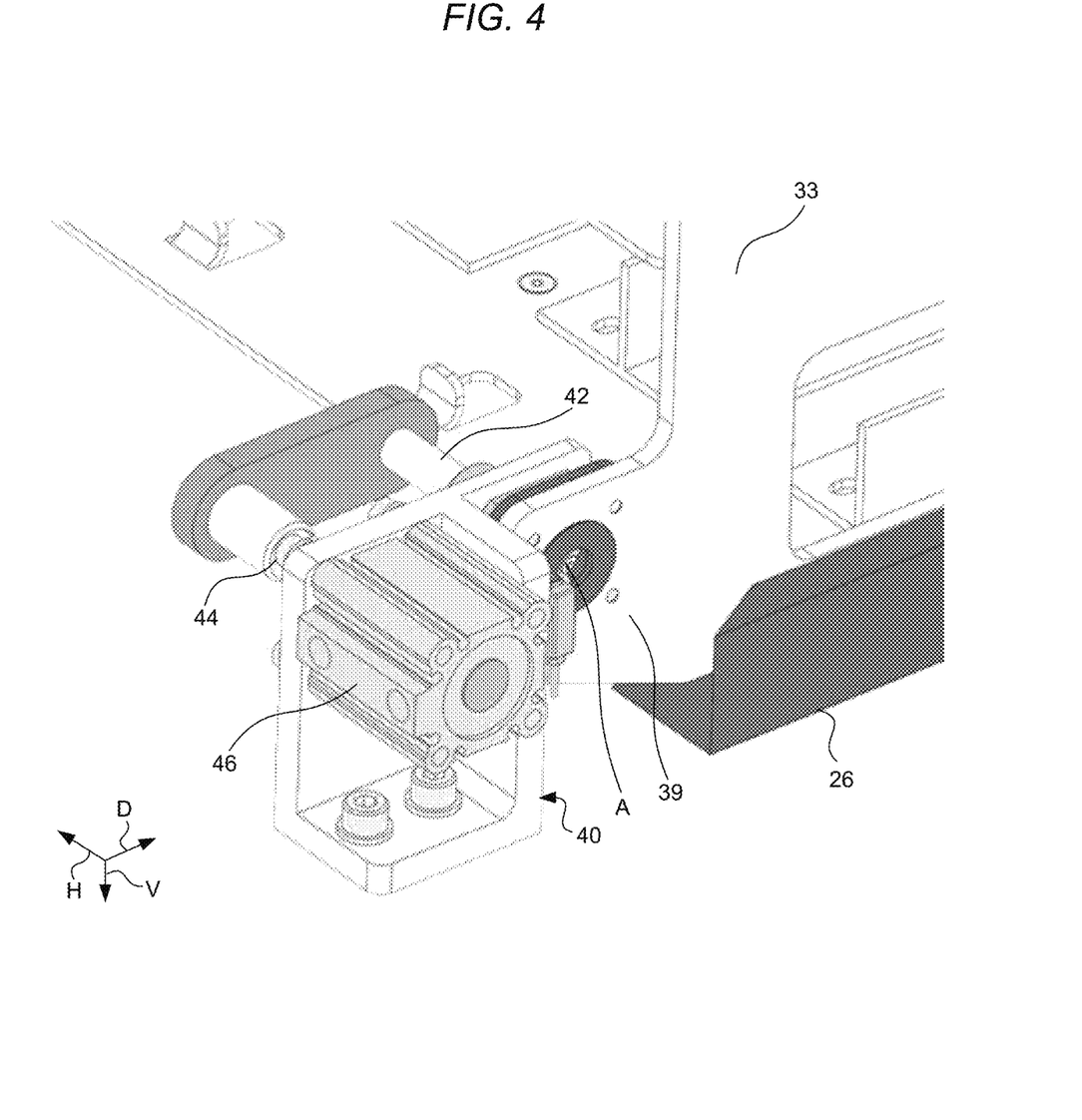
FIG. 4 is an enlarged perspective view of the coupling between the swappable carrier and the mounting bracket of FIG. 3.

Referring to FIG. 4, the swappable carrier 30 may be removably coupled to the housing 22 by engagement of a mounting ear 39 extending from each side panel 33 of the swappable carrier with corresponding mounting brackets 40 that are affixed to the housing. Each mounting ear 39 may contain an aperture A extending therethrough in the horizontal direction H. The swappable carrier 30 may be secured to the housing 22 of the cargo system 20 by engagement of a securing pin 42 into the aperture A. The securing pin 42 may be tapered in the horizontal direction, so that a press fit is created between the securing pin and the aperture A.

The securing pin 42 may be coupled to a shaft 44 that extends into a pneumatic cylinder 46, such that actuation of the pneumatic cylinder will translate the shaft in the horizontal direction H. Translation of the shaft 44 in the horizontal direction H will either engage the securing pin 42 into the aperture A, thereby securing the swappable carrier 30 to the housing 22, or will disengage the securing pin from the aperture, thereby decoupling the swappable carrier from the housing so that the swappable carrier may be withdrawn from the recess 24. Actuation of the pneumatic cylinder 46 to either couple the swappable carrier 30 with the housing 22 or to decouple the swappable carrier from the housing may be controlled by the control system 100 described above. According to other examples, actuation may be performed by an electric solenoid (not shown).

In the embodiment shown, two mounting brackets 40 are used, but in other example, any number of mounting brackets and corresponding mounting ears may be engaged to removably secure the swappable carrier 30 to the housing 22. In some examples, the mounting brackets may be replaced with another mechanism that is configured to removably couple the swappable carrier 30 with the housing 22

The design of the swappable carrier 30 shown in FIGS. 1-3 is just one example of the swappable carrier. Many other configurations of the swappable carrier 30 are contemplated, including swappable carriers having different numbers of rows 35 and columns 36 of slots 31, swappable carriers having slots with different widths and/or heights, and swappable carriers having different exterior shapes that may be received in a recess of the housing that has a corresponding exterior shape. In some configurations, the swappable carrier 30 may have a combination of different-sized slots 31, such that different types and/or sizes of payload units 16 may be stored in a single swappable carrier.

In one example of a flexible mobile robotics platform, there may be at least three types of swappable carriers 30 that may be stored at base stations (not shown) that the AGV 10 can autonomously interact with. The AGV 10 may locate such base stations using QR codes or other identification means, such as RFID. Further, navigation methods such as line-following navigation methods, simultaneous localization and mapping (SLAM), or other methods may be used to locate and navigate to payload swapping locations. When the AGV 10 reaches a base station, the robotic manipulator 12 may grasp a desired one of the swappable carriers 30, and the robotic manipulator may insert the swappable carrier 30 into the recess 24. Furthermore, the robotic manipulator 12 may also be configured to remove the swappable carrier 30 from the recess 24 and return the swappable carrier to a base station. Each swappable carrier 30 may have slots with different widths and/or heights than other swappable carriers, such that one type of payload unit that fits into slots of a first swappable carrier may not fit into slots of a second swappable carrier, and another type of payload unit that fits into slots of the second swappable carrier may not fit into slots of the first swappable carrier.

Figure 5:
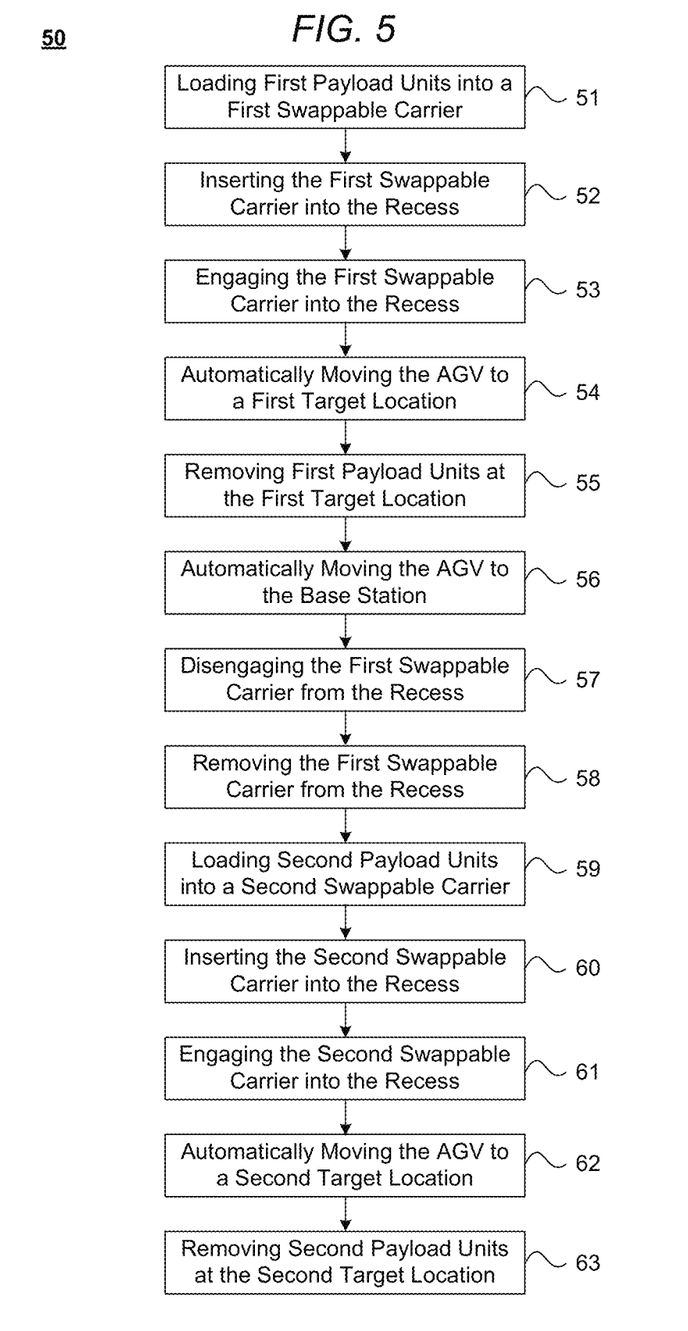
FIG. 5 is a flow diagram of a method using the AGV of FIG. 1A to deliver payload units.

Referring to FIG. 5, a method of using an AGV 10 to deliver cargo will now be described in a flow diagram 50. In step 51, a plurality of payload units 16 may be loaded into a plurality of slots 31 extending within a frame 32 of a first swappable carrier 30. This step may be performed at a base station before or after insertion of the first swappable carrier 30 into the recess 24 of the AGV 10.

In step 52, the first swappable carrier 30 may be inserted into the recess 24 of the housing 22 of the AGV 10. The first swappable carrier 30 may be aligned relative to the recess 24 in the horizontal direction H and the vertical direction V, and the first swappable carrier may be inserted into the recess by moving it relative to the housing 22 in the depth direction D. In some examples, the first swappable carrier 30 may be picked up and inserted into the recess 24 by the robotic manipulator 12. Alternatively, this step may be performed by a human or a secondary/external robotic device located at the base station. The robotic manipulator 12 may rotate the first swappable carrier 30 to be aligned with the recess 24 of the housing 22, and the robotic manipulator may translate the swappable carrier into the recess in the depth direction D. Once the first swappable carrier 30 is aligned with the recess 24, lower edges of the first swappable carrier may be guided into the rails 26.

In step 53, the first swappable carrier 30 may be engaged into the recess 24. To accomplish this, the robotic manipulator 12 may translate the first swappable carrier 30 along the rails 26 in the depth direction D until a mounting ear 39 extending from each side panel 33 of the swappable carrier contacts a respective mounting bracket 40 that is affixed to the housing 22. The first swappable carrier 30 may be secured to the housing 22 of the cargo system 20 by engagement of the securing pin 42 into the aperture A. Actuation of the pneumatic cylinder 46 or electric solenoid will translate the shaft 44 in the horizontal direction H, thereby engaging the securing pin 42 into the aperture A and securing the first swappable carrier 30 to the housing 22.

In step 54, the AGV 10 may automatically move from the base station to a first target location. This step may be controlled by the control system 100. In step 55, one or more of the payload units 16 from the first swappable carrier 30 may be removed and installed at the first target location. Optionally, additional payload units 16 from the first swappable carrier 30 may be removed and installed at additional target locations.

In step 56, the AGV 10 may automatically move from the first target location (or another target location) to the base station. In step 57, the first swappable carrier 30 may be decoupled and disengaged from the recess 24 of the AGV 10 by disengaging the securing pin 42 from the aperture A. In step 58, the swappable carrier may be withdrawn from the recess 24. This step may be performed by the robotic manipulator 12 or by a human or a robotic device located at the base station.

In step 59, a plurality of payload units 16 may be loaded into a plurality of slots 31 extending within a frame 32 of a second swappable carrier 30. This step may be performed at a base station before or after insertion of the second swappable carrier 30 into the recess 24 of the AGV 10. In some examples, at least one of the dimensions (length, width, height) of one or more of the payload units 16 that are inserted into the second swappable carrier 30 may be different than a respective corresponding one of the dimensions of the payload units that were inserted into the first swappable carrier, such that either the payload units that were inserted into the first swappable carrier do not fit in any of the slots 31 of the second swappable carrier, or the payload units that are inserted into the second swappable carrier do not fit in any of the slots of the first swappable carrier.

In step 60, the second swappable carrier 30 may be inserted into the recess 24 of the housing 22 of the AGV 10. In some examples, the second swappable carrier 30 may be picked up and inserted into the recess 24 by the robotic manipulator 12. Alternatively, this step may be performed by a human or a robotic device located at the base station. Once the second swappable carrier 30 is aligned with the recess 24, lower edges of the second swappable carrier may be guided into the rails 26.

In step 61, the second swappable carrier 30 may be engaged into the recess 24. To accomplish this, the robotic manipulator 12 may translate the second swappable carrier 30 along the rails 26 in the depth direction D until the mounting ear 39 contacts a respective mounting bracket 40. The second swappable carrier 30 may be secured to the housing 22 by engagement of the securing pin 42 into the aperture A. Actuation of the pneumatic cylinder 46 or electric solenoid will translate the shaft 44 in the horizontal direction H, thereby engaging the securing pin 42 into the aperture A and securing the second swappable carrier 30 to the housing 22.

In step 62, the AGV 10 may automatically move from the base station to a second target location. This step may be controlled by the control system 100. In step 63, one or more of the payload units 16 from the second swappable carrier 30 may be removed and installed at the second target location. Optionally, additional payload units 16 from the second swappable carrier 30 may be removed and installed at additional target locations.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. An automated cargo delivery system, comprising:
   an automated guided vehicle having a housing defining a recess therein and a propulsion system configured to move the housing,
   wherein the recess is configured to receive a plurality of swappable carriers each having a uniform width in a horizontal direction and a uniform height in a vertical direction perpendicular to the horizontal direction, each of the swappable carriers configured to be engaged within the recess, the plurality of swappable carriers including a first swappable carrier and a second swappable carrier; and
   wherein the automated guided vehicle further comprises an actuatable lock that is configured to alternately engage with a corresponding feature of a first frame of the first swappable carrier and a second frame of the second swappable carrier, the actuatable lock being configured to alternatingly securely retain the first swappable carrier and the second swappable carrier within the recess.

2. The automated cargo delivery system of claim 1, wherein the automated guided vehicle further comprises a rail affixed to the housing and extending within the recess in the depth direction, the rail being configured to alternately engage with a corresponding portion of the first frame of the first swappable carrier and with a corresponding portion of the second frame of the second swappable carrier.

3. The automated cargo delivery system of claim 1, wherein the propulsion system includes a plurality of wheels rotatably mounted to the housing, a driving element configured to rotate the wheels, a steering system configured to pivot the wheels and navigate the housing along predetermined paths, and a processor configured to control a motor and the steering system.

4. The automated cargo delivery system of claim 1, further comprising the first swappable carrier, wherein the first swappable carrier is disposed within the recess, and the actuatable lock is engaged with the corresponding feature of the first frame of the first swappable carrier, such that the first swappable carrier is securely retained within the recess.

5. The automated cargo delivery system of claim 1, wherein each row of slots of the first frame of the first swappable carrier and the second frame of the second swappable carrier is supported by a respective support plate that defines a respective plane that extends in the depth direction and the horizontal direction, and adjacent ones of the slots of the first frame and the second frame are separated from one another by a respective separation plate that defines a respective plane extending in a depth direction and the vertical direction.

6. The automated cargo delivery system of claim 1 wherein at least one of the first frame of the first swappable carrier or the second frame of the second swappable carrier defines additional slots extending therein, each of the additional slots having third dimensions including a third width in the horizontal direction and a third height in the vertical direction, and at least one of the third dimensions is different than a respective corresponding one of first dimensions or second dimensions.

7. The automated cargo delivery system of claim 1, further comprising:
   a first payload unit received within each of the first slots, each of the first payload units having a unit width in the horizontal direction that is less than the uniform width and a unit height in the vertical direction that is less than the uniform height, the first payload units being securely engaged within the first slots.

8. The automated cargo delivery system of claim 1, further comprising a robotic manipulator mounted to the housing, the robotic manipulator having an end effector remote from the housing that is configured to alternatingly grasp the first payload unit and the second payload unit, the robotic manipulator being configured to removably insert the first payload unit into one of the first slots and configured to removably insert the second payload unit into one of the second slots.

9. The automated cargo delivery system of claim 1, wherein:
   the first swappable carrier includes the first frame defining a plurality of uniform first slots extending within the first frame in a depth direction perpendicular to the horizontal direction and the vertical direction, each of the first slots configured to removably receive a first payload unit therein, each of the first slots having first dimensions including a first width in the horizontal direction and a first height in the vertical direction,
   the second swappable carrier includes the second frame defining a plurality of uniform second slots extending within the second frame in the depth direction, each of the second slots configured to removably receive a second payload unit therein, each of the second slots having second dimensions including a second width in the horizontal direction and a second height in the vertical direction, and
   at least one of the first dimensions is different than a respective corresponding one of the second dimensions, such that either the first payload unit does not fit in any of the second slots or the second payload unit does not fit in any of the first slot.

10. The automated cargo delivery system of claim 1, wherein a first number of the first slots are arranged within the first swappable carrier in a first grid of rows and columns extending in the respective horizontal and vertical directions, and a second number of the second slots are arranged within the second swappable carrier in a second grid of rows and columns, the first number being different than the second number.

11. A method of delivering cargo with an automated guided vehicle, the method comprising:
inserting and engaging a first swappable carrier into a recess defined in a housing of the automated guided vehicle;
automatically moving the automated guided vehicle from a base station to a first target location;
automatically moving the automated guided vehicle from the first target location to the base station;
disengaging and removing the first swappable carrier from the recess of the automated guided vehicle;
inserting and engaging the second swappable carrier into the recess of the automated guided vehicle, the second swappable having a different payload unit storage configuration than the first swappable carrier;
automatically moving the automated guided vehicle from the base station to a second target location;
loading a plurality of first payload units into a plurality of uniform first slots extending within a first frame of the first swappable carrier, the first slots extending in a depth direction of the first swappable carrier, each of the first slots having first dimensions including a first width in a horizontal direction perpendicular to the depth direction and a first height in a vertical direction perpendicular to both the depth and vertical directions;
removing one of the first payload units from the first swappable carrier and installing the one of the first payload units at the first target location;
loading a plurality of second payload units into a plurality of uniform second slots extending within a second frame of the second swappable carrier, the second slots extending in the depth direction, each of the second slots having second dimensions including a second width in the horizontal direction and a second height in the vertical direction; and
removing one of the second payload units from the second swappable carrier and installing the one of the second payload units at the second target location,
wherein at least one of the first dimensions is different than a respective corresponding one of the second dimensions, such that either the first payload unit does not fit in any of the second slots or the second payload unit does not fit in any of the first slots.

12. The method of claim 11, wherein the first and second swappable carriers each have a uniform width in a horizontal direction and a uniform height in a vertical direction perpendicular to the horizontal direction.

13. The method of claim 11, wherein the inserting of the first and second swappable carriers into the recess of the automated guided vehicle includes sliding the respective first and second swappable carriers along a rail that is affixed to the housing and that extends within the recess in a depth direction of the recess.

14. The method of claim 11, wherein the automatically moving steps are performed by a propulsion system rotating a plurality of wheels that are mounted to the housing and by a steering system that pivots the wheels and navigates the housing along predetermined paths.

15. The method of claim 11, wherein the inserting of the first and second swappable carriers into the recess of the automated guided vehicle is performed by an end effector of a robotic manipulator mounted to the housing of the automated guided vehicle.

16. The method of claim 11, wherein the loading of the first and second payload units and the removing of the one of the first and second payload units is performed by an end effector of a robotic manipulator mounted to the housing of the automated guided vehicle.

17. The method of claim 11, wherein a first number of the first slots are arranged within the first swappable carrier in a first grid of rows and columns extending in the respective horizontal and vertical directions, and a second number of the second slots are arranged within the second swappable carrier in a second grid of rows and columns, the first number being different than the second number.

18. The method of claim 11, wherein at least one of the first frame of the first swappable carrier or the second frame of the second swappable carrier defines additional slots extending therein, each of the additional slots having third dimensions including a third width in the horizontal direction and a third height in the vertical direction, and at least one of the third dimensions is different than a respective corresponding one of the first dimensions or the second dimensions.

19. A method of delivering cargo with an automated guided vehicle, the method comprising:
inserting and engaging a first swappable carrier into a recess defined in a housing of the automated guided vehicle;
automatically moving the automated guided vehicle from a base station to a first target location;
automatically moving the automated guided vehicle from the first target location to the base station;
disengaging and removing the first swappable carrier from the recess of the automated guided vehicle;
inserting and engaging the second swappable carrier into the recess of the automated guided vehicle; and
automatically moving the automated guided vehicle from the base station to a second target location;
wherein the engaging of the first and second swappable carriers into the recess of the automated guided vehicle includes actuating a lock that engages with a corresponding feature of first and second frames of the respective first and second swappable carriers.

20. The method of claim 19, wherein the actuating of the lock includes actuating a pneumatic cylinder that translates a securing pin into engagement with an aperture extending through a structural member of a respective one of the first and second frames.

21. The method of claim 19, wherein:
the inserting and engaging the second swappable carrier into the recess of the automated guided vehicle occurs while the second swappable carrier is pre-loaded with components for a mission at the second target location.

22. The method of claim 21, wherein the disengaging and removing the first swappable carrier from the recess of the automated guided vehicle occurs while the first swappable carrier is loaded with used components.

* * * * *